United States Patent [19]

Pattern

[11] Patent Number: 4,763,740

[45] Date of Patent: Aug. 16, 1988

[54] LOAD CELL

[76] Inventor: George Pattern, 499 Seaton Street, Winnipeg, Manitoba, Canada, R3K 1M3

[21] Appl. No.: 42,678

[22] Filed: Apr. 27, 1987

[51] Int. Cl.[4] .......................... G01G 3/14; G01G 3/08
[52] U.S. Cl. ................... 177/210 R; 177/229; 177/DIG. 6
[58] Field of Search ............ 177/210 R, DIG. 6, 229, 177/211

[56] References Cited

U.S. PATENT DOCUMENTS

| | | | |
|---|---|---|---|
| 3,955,638 | 5/1976 | Wasko | 177/DIG. 6 |
| 4,216,837 | 8/1980 | Pryor et al. | 177/DIG. 6 |
| 4,601,356 | 7/1986 | Muccillo, Jr. | 177/211 |
| 4,606,421 | 8/1986 | Schroeder | 177/211 |
| 4,614,245 | 9/1986 | Yamanaka | 177/229 X |

Primary Examiner—George H. Miller, Jr.
Attorney, Agent, or Firm—Adrian D. Battison; Stanley G. Ade

[57] ABSTRACT

A load cell comprises a block with a recess in an upper rectangular surface thereof. A plate overlies the upper surface and is parallel thereto and spaced therefrom by a spacer interconnecting the block and the plate at one end of the plate so the remainder of the plate can deform on application of a load to an upper surface thereof. The position of application can be adjusted along the length of the plate. Damage to the plate is avoided on application of an excessive load by its engagement with the upper surface of the block. The deformation of the plate is measured by an adjustable screw which projects downwardly from an undersurface thereof into the recess which contains a circuit board carrying an optical switch so that the screw gradually interrupts the transmission of light from a light emitting infrared diode to a photo transistor of the optical switch.

19 Claims, 2 Drawing Sheets

LOAD CELL

BACKGROUND OF THE INVENTION

This invention relates to a load cell which is generally a device for providing an electrical output proportional to a force applied to the cell.

Load Cells are used in widely different locations but one particular common type of cell includes a body formed from a single block of material which has various openings cut in the block so the whole block can distort when a load is applied at one end. This distortion is measured by strain gauges mounted within the body of the block with the strain gauges arranged in conjunction t with a bridge circuit so that they provide an output proportional to the load applied.

Load Cells of this type have been widely used for many years and represent the standard in the industry at the present time. They do however have a number of severe disadvantages. Firstly the device is expensive to manufacture since it requires recesses to be formed in the block which are of a complex shape and which are manufactured to close tolerance to provide the necessary deformation characteristics. Secondly the load cell is only responsive to forces within a predetermined range and therefore it is necessary to manufacture various load cells of differing sizes to accommodate different ranges of force. This again increases cost in view of the necessity of manufacturing and holding a wide range of inventory. Thirdly the application of a load greater than the predetermined range to the block can cause deformation of the block beyond its elastic limit and thus the device is effectively destroyed and requires replacement.

SUMMARY OF THE INVENTION

It is one object of the present invention, therefore, to provide an improved load cell device which can be manufactured more simply and accordingly more cheaply than conventional devices and employs conventionally available parts.

According to the first aspect of the invention, therefore, there is provided a Load Cell for providing an electrical output proportional to a value of an applied force comprising a first member, a second member, means mounting the first member on the second member, means provided on one of said members for receiving a force applied to said one of said members and arranged with said mounting means such that said force causes a relative movement between said members proportional to the value of the applied force, and means for sensing the amount of said relative movement comprising an optical switch means having a light emitting diode, a photo transistor and means mounting said diode and transistor in closely spaced relationship and defining a space there between such that light emitted by the diode passes across the space and impinges on the transistor, means mounting the optical switch means on said second member and a shield member mounted on said first member and projecting therefrom to a position closely adjacent the optical switch means and arranged such that said relative movement causes said shield member to enter into said space to block said emitted light and thus to reduce the intensity of said light impinging on said transistor.

It is a further object of the present invention to provide an improved load cell which overcomes the problem of damage on application of excessive load since deformation of the load cell is automatically limited.

According to the invention, therefore, it is provided a Load Cell for providing an electrical output proportional to a value of an applied force comprising a first member, a second member, means mounting the first member on the second member, means provided on one of said members for receiving a force applied to said one of said members and arranged with said mounting means such that said force causes a relative movement between said members proportional to the value of the applied force of said relative movement said first member comprising a block portion, said second member comprising a flexible plate portion and wherein there is provided a spacer mounting said plate portion on said block portion for flexing movement of said plate member relative thereto, said spacer defining a gap between said plate member and said block member and arranged such that application of said force tends to decrease the spacing between said plate member and said block member, the gap defined between said plate member and said block member by said spacer providing an amount of movement of said plate which is less than that movement which defines the elastic limit of the plate, an upper face of said block member adjacent said plate member including a recess formed therein, said sensing means being mounted in said recess.

Basically, therefore the load cell uses an alternative technique for detecting the deformation of the first member by providing the shield which is carried by the first member and projects between the legs of a conventional horseshoe shaped optical switch. Preferably the switch is directly mounted on a circuit board carried on the first member in a recess defined in an upper surface of the first member.

Preferably, the second member is defined by a plate mounted on the first member and spaced therefrom by a spacer which defines a gap into which the second member can deform by application thereto of the load. The position of the load along the length of the plate from the spacer toward an outer end thereof gradually increases the mechanical advantage of the force and thus defines the plurality of different ranges of force which move the plate from its rest position to a maximum deform position.

In the maximum deformed position the plate engages the block thus preventing any further deformation of the plate with the amount of deformation up to the contact being arranged to be less than the elastic limit to avoid damaging the plate.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DETAILED DESCRIPTION

Figure 1:
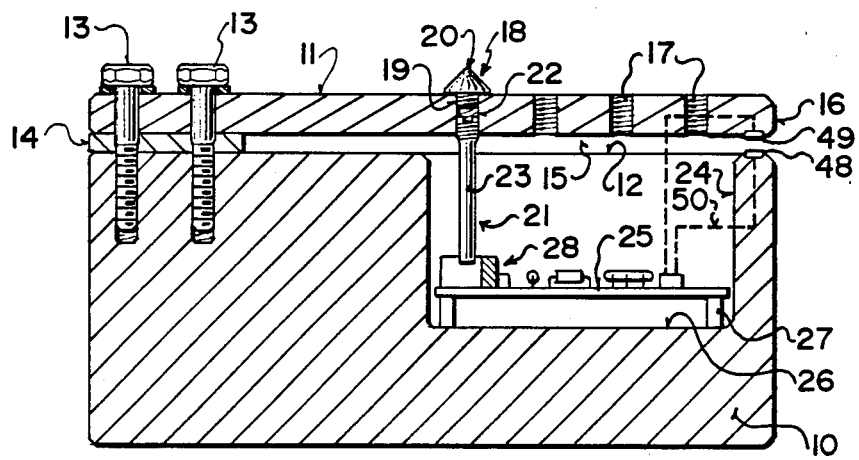
FIG. 1 is a cross sectional view along the lines 11 of FIG. 2 showing a load cell according the present invention.
Figure 2:
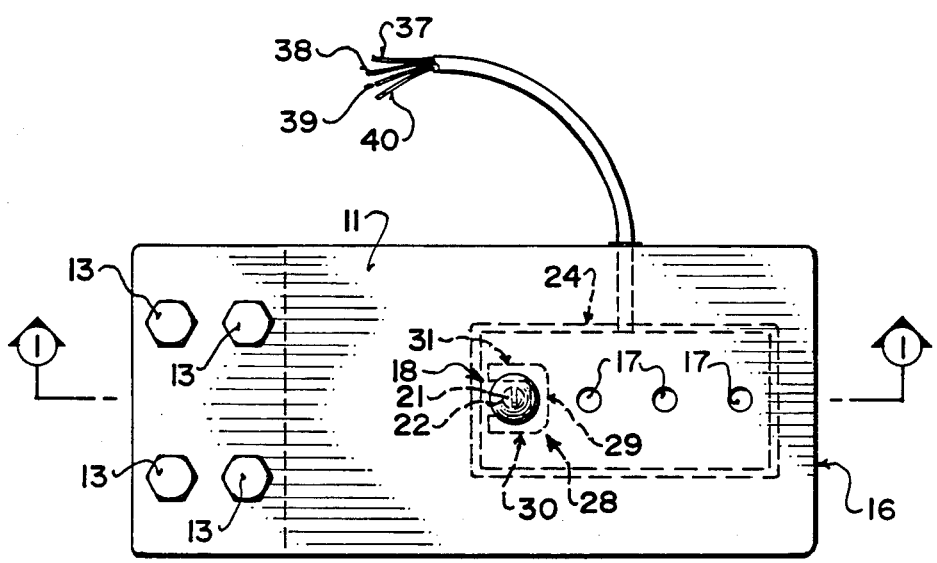
FIG. 2 is a top plan view of the load cell of FIG. 1.

The load cell comprises a base block 10 and a plate 11 with the plate 11 being substantially coextensive with an upper surface 12 of the block 10. The plate 11 is bolted to the block 10 at one end as indicated by bolts 13 so that it is rigidly attached thereto but is spaced therefrom by a spacer 14 which extends between the other surface of the plate 11 on the upper surface 12 of the block 10 only over a short length thereof leaving the majority of the plate 11 cantilevered out from its attachment to the block 10.

The upper surface 12 of the block 10, the spacer 14 and the under surface of the plate 11 are all carefully manufactured to tolerance to provide therebetween a gap 15 which is parallel and extends from the spacer to an outer end 16 of the plate 11. In one preferred embodiment the plate 11 is manufactured from half inch steel and thus will bend when a force is applied to the upper surface thereof in a vertically downward direction with the bending acting to reduce the gap 15 until the plate contacts the upper surface 12 at the outer most end 16 of the plate. In one example the gap can be 1/16th inch with the length of the plate being of the order of 5 inches which enables any deformation of the plate to be halted by its engagement with the upper surface 12 well before any permanent deformation of the plate occurs that is before it reaches its elastic limit.

An upper surface of the plate includes a plurality of blind screwthreaded holes 17 each for receiving a force receiving member one of which is indicated at 18. The force receiving member includes a screw threaded male peg 19 which can be screwed into a chosen one of the holes 17 together with a conical shaped upper portion converging to an apex 20 at which the force is applied. It would be appreciated that the position of the member 18 in a chosen one of the holes 17 changes the mechanical advantage of the force relative to the fulcrum defined by the edge of the spacer 14 and thus increases or decreases the amount of deflection of the plate 11 in response to a predetermined force. Regardless of the position of the member 18, however, the force cannot cause damage to the plate 11 since the amount of deformation thereof is limited by the gap 15.

Movement of the plate 11 is communicated to an elongate screw member 21 which is positioned in a hole 22 through the plate 11 arranged approximately midway between the edge of the spacer 14 and the outer edge 16 of the plate. The screw 21 includes an elongate leg 23 which projects downwardly from the underside of the plate 11 into a recess 24 formed in the upper surface of the block 10. The recess 24 is rectangular and extends approximately halfway into the block from a position adjacent the hole 22 to a position adjacent the edge 16 of the plate.

Figure 4:
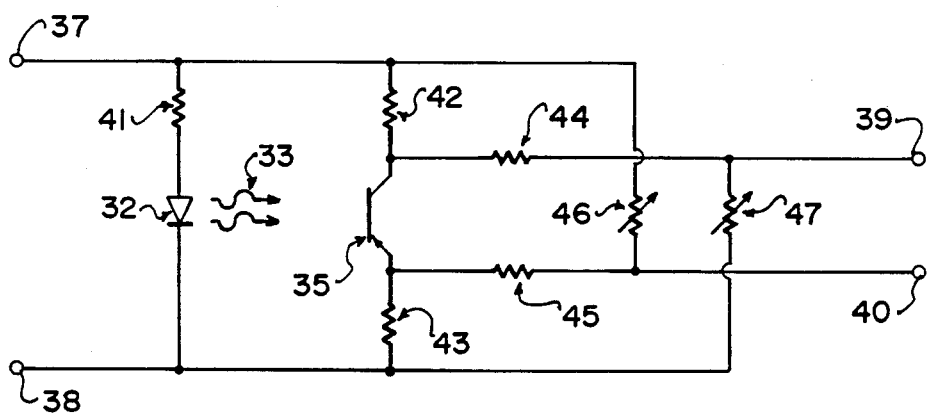
FIG. 4 is a schematic illustration of the circuit of the load cell of FIGS. 1 and 2.

The recess 24 is dimensioned to just receive a circuit board 25 which is also of rectangular shape with the circuit board mounted on a base 26 of the recess and supported upwardly therefrom by four pegs 27. The circuit board carries the circuit as shown in FIG. 4 and particularly an optical switch 28. Optical switches are commercially available and comprise a generally horseshoe shaped potting material forming a transverse base 29 and legs 30, 31. Within the leg 30 is mounted a light emitting diode 32 of a type which is arranged to emit infrared light in a beam indicated at 33 which passes through the potting material across a space 34 defined between the legs 30 and 31 to the leg 31 at which it is received by a phototransistor 35. Wires exiting from the diode and the phototransistor are indicated generally at 36.

In practice the width of the beam is of the order of 0.035 inches with little dispersed and reflected light constituting the light from the diode which reaches the transistor 35.

Figure 3:
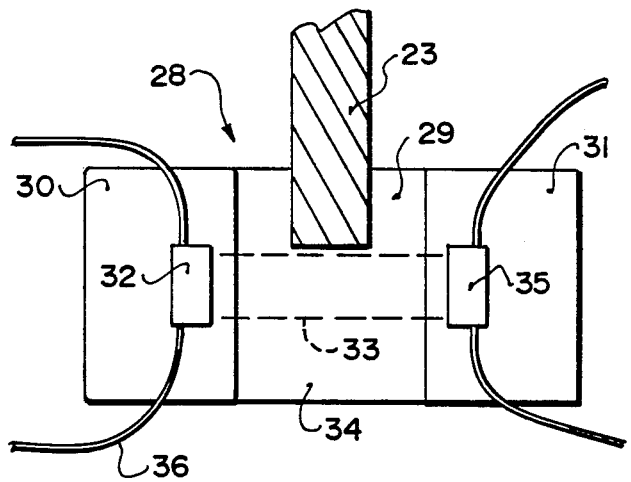
FIG. 3 is an enlarged view of the optical switch of the load cell of FIGS. 1 and 2.

The leg 23 as shown in FIG. 3 in a rest position is arranged immediately above an upper edge of the beam 33 so as, in the rest position, not to interfere with the transmission of light directly from the diode to the transistor. It will be appreciated, however, that distortion of the plate 11 caused by application thereto of a load causes the leg 23 to move downwardly into the beam and thus act as a shield to prevent the beam from reaching the transistor 35.

The circuit mounted on the circuit board 25 is shown schematically in FIG. 4 as including the light emitting diode 32, the phototransistor 35, a positive voltage input 37, a negative voltage input 38, a positive output 39 and a negative output 40. The circuit as shown including resistors 41, 42, 43, 44, and 45 together with variable resistors 46 and 47 provides power to the diode 32 and also causes a voltage across the photo transistor 35. The voltage across the transistor 35 causes current to flow through the transistor in dependance upon the intensity of light from the diode reaching the transistor. In the rest position of the plate 11, therefore, the current passing through the transistor is at a maximum gradually reducing to zero as the plate is deformed and thus the leg 23 moves to shield more and more of the beam 33 from its intended path. It has been found that the output generated at the terminals 39 and 40 constitutes a linear output directly proportional to distortion of the plate 11 and the circuit is arranged so that the output is identical in form to the conventional output of a conventional load cell which includes strain gauges and a bridge circuit arrangement so that the load cell of the present invention can be used in direct replacement for the conventional load cell described previously.

It will be appreciated that the amount of deformation of the plate allowed by the gap 15 enables the leg 23 to move through the hole of the beam to a position in which it is covering or shielding the whole of the beam and to a position slightly past the beam before the deformation of the plate is halted by its engagement with the block. The initial position at rest of the leg 23 can be adjusted by screwing the screw 21 within the screwthreaded hole 22 to move it upwardly and downwardly to achieve a rest position in which the lower end of the leg is immediately adjacent the upper edge of the beam. Callibration of the device can be carried out simply by adjustment of the variable resistors 46 and 47 by application to the plate of a known load.

A pair of contacts 48 and 49 can optionally be provided at the point of engagement between the plate 11 and the block 10 and connected into the circuit by wires 50 so that the circuit can be controlled to provide an indication of an overload condition in which the plate has engaged the block. The operator will then immediately know that the force applied is too great for the range allowed by the positioning of the member 18 in the chosen one of the holes 17 so the device can be adjusted if required or the load reduced to a load falling within the range of operation of the device.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A load cell for providing an electrical output proportional to a value of an applied force comprising a first member, a second member, means interconnecting the first member and the second member, means provided on one of said members for receiving a force applied to said one of said members and arranged with said interconnecting means such that said force causes a relative movement between said members proportional to the value of the applied force, and means for sensing the amount of said relative movement comprising an optical switch means having a light source consisting of a light emitting diode and a light detecting means consisting of a single photo transistor, means mounting said diode and said single transistor in closely paced relationship and defining a space there between such that light emitted by the diode passes across the space and impinges on said single transistor, means mounting the optical switch means on said second member, a shield member mounted on said first member and projecting therefrom to a position closely adjacent the optical switch means and arranged such that said relative movement causes said shield member to move relative to said space to alter an amount of said emitted light blocked by said shield and thus to alter the intensity of said light impinging on said single transistor and a detector circuit for generating an electrical signal in response to said intensity of light, said detector circuit comprising means for generating a voltage across said single transistor and means for detecting variations in current flowing in said transistor caused by said variation in intensity.

2. The invention according to claim 1 wherein in said optical switch means comprises a unitary body mounting said diode and said transistor, said unitary body being generally of a horseshoe shape with said diode and said transistor being mounted in opposed legs of said shape and having operative faces thereof facing inwardly from said legs.

3. The invention according to claim 1 wherein said shield member comprises an elongate body a position of an end of which relative to said optical switch means can be adjusted relative to said second member.

4. The invention according to claim 1 wherein said optical switch means is mounted on a circuit board, said circuit board being carried on said first member.

5. The invention according to claim 1 wherein said light emitting diode is arranged to emit a beam of infrared light.

6. The invention according to claim 1 wherein said sensing means includes a circuit carried on said first member and including a first input, a second input for generating a voltage across said diode and a first output and a second output for providing voltage outputs dependant upon the current passing through said phototransistor.

7. The invention according to claim 1 wherein said receiving means on said one of said members defines a plurality of positions for receiving said force arranged such that a predetermined force provides a different amount of relative movement when applied to each of said different positions.

8. The invention according to claim 1 wherein said first member comprises a block portion and wherein said second member comprises a flexible plate portion and wherein there is provided a spacer mounting said plate portion on said block portion for flexing movement of said plate member relative thereto, said spacer defining a gap between said plate member and said block member and arranged such that application of said force tends to decrease the spacing between said plate member and said block member.

9. The invention according to claim 8 wherein an upper face of said block member adjacent said plate member includes a recess formed therein and wherein said optical switch means is mounted in said recess and wherein said shield member is mounted on said plate member on an underside thereof for projecting into said recess.

10. The invention according to claim 8 wherein the gap defined between said plate member and said block member by said spacer provides an amount of movement of said plate which is less than that movement which defines the elastic limit of the plate.

11. The invention according to claim 8 wherein the spacer defines a gap between the plate member and the block member which allows movement of said shield member which is greater than the amount of movement necessary to move from a position of said shield member free from said beam to a position totally blocking said beam.

12. The invention according to claim 8 including electrical contact means between said plate member and said block member for detecting of movement of said plate member to a position engaging said block member.

13. The invention according to claim 8 wherein said block member includes a recess in a surface thereof facing said plate member, said recess being positioned partway therealong and spaced from each end of said block, said plate member carrying said shield member and extending therefrom into said recess, said shield member being positioned on said plate member at a position spaced from the ends thereof.

14. The invention according to claim 13 wherein said optical switch means is mounted upon a circuit board and wherein said circuit board is mounted in said recess.

15. A load cell for providing an electrical output proportional to a value of an applied force comprising a first member, a second member, means mounting the first member on the second member, means provided on one of said members for receiving a force applied to said one of said members and arranged with said mounting means such that said force causes a relative movement between said members proportional to the value of the applied force of said relative movement said first member comprising a block portion, said second member comprising a flexible plate portion and wherein there is provided a spacer mounting said plate portion on said block portion for flexible movement of said plate member relative thereto, said spacer defining a gap between said plate member and said block member and arranged such that application of said force tends to decrease the spacing between said plate member and said block member, the gap defined between said plate member and said block member by said spacer providing an amount of movement of said plate which is less than the movement which defines the elastic limit of the plate, an upper face of said block member adjacent said plate member including a recess formed therein, said sensing means being mounted in said recess, wherein said sensing means comprises an optical switch having a light emitting diode, a photo transistor and means mounting said diode and transistor in closely spaced relationship and defining a space there between such that light emitted by the iooe passes across the space and impinges o the transistor, means mounting the optical switch means on said second member and a shield member mounted on said first member and projecting therefrom to a position closely adjacent the optical switch means and arranged such that said relative movement causes said shield thus to reduce the intensity of said light impinging on said transistor.

16. The invention according to claim 15 wherein said optical switch means comprises a unitary body mounting said diode and said transistor, said unitary body being generally of a horseshoe shape with said diode and said transistor being mounted in opposed legs of said shape and having operative faces thereof facing inwardly from said legs.

17. The invention according to claim 15 wherein said shield member comprises an elongate body of a position of an end of which relative to said optical switch means can be adjusted relative to said second member.

18. The invention according to claim 15 wherein said optical means is mounted on a circuit board, said circuit board being carried on said first member.

19. The invention according to claim 15 wherein said light emitting diode is arranged to emit a beam of infrared light.

* * * * *